(12) United States Patent
Cho et al.

(10) Patent No.: US 12,534,844 B2
(45) Date of Patent: Jan. 27, 2026

(54) CLOTHING TREATMENT APPARATUS

(71) Applicant: LG Electronics Inc., Seoul (KR)

(72) Inventors: Hongjun Cho, Seoul (KR); Jongmin Lee, Seoul (KR); Ingeun Ahn, Seoul (KR); Juhan Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/702,606

(22) PCT Filed: Oct. 26, 2022

(86) PCT No.: PCT/KR2022/016394
§ 371 (c)(1),
(2) Date: Apr. 18, 2024

(87) PCT Pub. No.: WO2023/080523
PCT Pub. Date: May 11, 2023

(65) Prior Publication Data
US 2025/0290245 A1   Sep. 18, 2025

(30) Foreign Application Priority Data

Nov. 2, 2021 (KR) .................. 10-2021-0148578
Nov. 2, 2021 (KR) .................. 10-2022-0077300

(51) Int. Cl.
*D06F 37/30* (2020.01)
*D06F 37/04* (2006.01)
*D06F 58/08* (2006.01)
*D06F 58/20* (2006.01)
*H02K 5/124* (2006.01)
*H02K 7/00* (2006.01)
*H02K 7/08* (2006.01)

(52) U.S. Cl.
CPC ............ *D06F 37/304* (2013.01); *D06F 37/04* (2013.01); *D06F 58/08* (2013.01); *D06F 58/20* (2013.01); *H02K 5/124* (2013.01); *H02K 7/003* (2013.01); *H02K 7/083* (2013.01)

(58) Field of Classification Search
CPC .................................... D06F 37/304
See application file for complete search history.

(56) References Cited

U.S. PATENT DOCUMENTS

2021/0040672 A1   2/2021   Hu et al.

FOREIGN PATENT DOCUMENTS

AU   2019386525 A1   6/2021
CN   102965878   3/2013
(Continued)

OTHER PUBLICATIONS

International Search Report and Written Opinion in International Appln. No. PCT/KR2022/016393, mailed on Feb. 13, 2023, 28 pages (with English translation).
(Continued)

*Primary Examiner* — Jason Y Ko
(74) *Attorney, Agent, or Firm* — Fish & Richardson P.C.

(57) ABSTRACT

A clothing treatment apparatus includes a drum body, a front cover, a rear cover, and a drum inlet port, a fixing panel spaced apart from the rear cover, a power transmission including a housing, an input shaft, an output shaft, a gear in the housing, and a motor including a stator and a rotor. The drum body, the rear cover, and the front cover are formed of a same material, and the thickness of the drum body is less than the thickness of the rear cover and the thickness of the front cover.

13 Claims, 11 Drawing Sheets

(56) References Cited

FOREIGN PATENT DOCUMENTS

| | | | |
|---|---|---|---|
| CN | 110144703 | A | 8/2019 |
| JP | H02-102696 | A | 4/1990 |
| JP | H05-64638 | U | 8/1993 |
| JP | 2004-129994 | A | 4/2004 |
| JP | 2009-506797 | A | 2/2009 |
| JP | 2013-085686 | A | 5/2013 |
| JP | 2013-126495 | A | 6/2013 |
| JP | 2015-532842 | A | 11/2015 |
| JP | 2017-503586 | A | 2/2017 |
| KR | 10-2005-0120975 | | 12/2005 |
| KR | 10-2006-0121078 | | 11/2006 |
| KR | 10-2010-0129117 | | 12/2010 |
| KR | 10-2011-0025563 | A | 3/2011 |
| KR | 10-1275198 | | 6/2013 |
| KR | 10-2014-0102014 | | 8/2014 |
| KR | 10-2018-0086892 | | 8/2018 |
| KR | 10-2019-0101812 | | 9/2019 |
| KR | 10-2020-0065931 | A | 6/2020 |
| KR | 10-2020-0065932 | | 6/2020 |
| KR | 10-2020-0106555 | | 9/2020 |
| KR | 10-2251062 | | 5/2021 |

OTHER PUBLICATIONS

International Search Report and Written Opinion in International Appln. No. PCT/KR2022/016394, mailed on Feb. 20, 2023, 15 pages (with English translation).
Office Action in Korean Appln. No. 10-2021-0148578, mailed on Mar. 4, 2024, 10 pages (with English translation).
Notice of Allowance in Japanese Appln. No. 2024-522482, mailed on Jan. 28, 2025, 4 pages (with English translation).
Office Action in Japanese Appln. No. 2024-522628, mailed on Feb. 25, 2025, 5 pages (with English translation).
Extended European Search Report in European Appln. No. 22890257.3, mailed on Sep. 18, 2025, 7 pages.
Extended European Search Report in European Appln. No. 22890258.1, mailed on Sep. 17, 2025, 7 pages.
Office Action in Japanese Appln. No. 2024-522628, mailed on Jul. 15, 2025, 8 pages (with English translation).
Office Action in Japanese Appln. No. 2024-522628, mailed on Oct. 28, 2025, 8 pages (with English translation).

CLOTHING TREATMENT APPARATUS

CROSS-REFERENCE TO RELATED APPLICATIONS

This application is a National Stage application under 35 U.S.C. § 371 of International Application No. PCT/KR2022/016394, filed on Oct. 26, 2022, which claims the benefit of Korean Application Nos. 10-2022-0077300, filed on Nov. 2, 2021, and 10-2021-0148578, filed on Nov. 2, 2021. The disclosures of the prior applications are incorporated by reference in their entirety.

TECHNICAL FIELD

This application relates to clothing processing apparatus.

BACKGROUND ART

A clothing processing apparatus is a generic term referring to a washing machine for washing clothing (an object to be washed or an object to be dried), a dryer for drying clothing, and an apparatus capable of performing both washing and drying of clothing.

A washing machine generally includes a tub configured to store water, a washing drum provided inside the tub to store clothing, and a driver (or washing driver) configured to rotate the washing drum, and a dryer generally includes a drying drum configured to store clothing, a driver (or drying driver) configured to rotate the drying drum, and a heat exchanger configured to supply air to the drying drum to remove moisture from the clothing.

The washing driver generally includes a stator fixed to a tub to form a rotating magnetic field, a rotor rotated by the rotating magnetic field, and a rotating shaft arranged through the tub to connect the washing drum and the rotor, while the drying driver generally includes a motor, a pulley fixed to a rotating shaft of the motor, and a belt (power transmitter) connecting the rotational motion of the pulley to the drying drum.

The washing driver is arranged such that the rotating shaft of the motor connects the washing drum and the rotor. In order to wash or spin clothes, the washing driver needs to control the rotational speed of the washing drum to be high or to change the rotation direction of the washing drum. By arranging the rotating shaft of the motor to directly connect the washing drum and the rotor, the rotational speed and rotation direction of the washing drum may be easily controlled.

The conventional drying driver generally has a structure in which a power transmitter such as a belt connects the drying drum and the rotating shaft of the motor. This is because the dryer rarely needs to maintain a high rotational speed of the drying drum or change the direction of rotation of the drying drum, and thus it is allowed to rotate the drying drum through a power transmitter such as a belt. However, if the speed and direction of rotation of the drying drum can be changed, the movement of the clothes inside the drying drum may be controlled, and thus the dryer can be expected to shorten the drying time and improve the drying performance.

A conventional dryer is equipped with a drying driver that connects the rotor and the drying drum with a reducer (power transmitter) (Korean Patent Application Publication No. 10-2020-0065931). The drying driver is configured by coaxially arranging an input shaft connected to the rotor and an output shaft connected to the drying drum, such that the drying time may be shortened or the drying performance may be improved.

The above-described dryer can control the number of rotations of the drying drum in various ways as well as change the direction of rotation. Accordingly, the durability of the drying drum to which the rotating shaft is fixed and the durability of the panel supporting the drying drum are likely to be reduced.

Furthermore, since the dryer configured as described above allows the vibration of the drum to be transmitted to the reducer and a fixing panel to which the reducer is fixed, the durability of the reducer and the durability of the fixing panel may be reduced due to vibration of the drum.

In addition, lubricating oil is stored inside the reducer provided in the above-described dryer. In the case of a structure in which the drying drum rotates around a rotating shaft arranged horizontal to the ground, a mating surface of the housing is located on the circumferential surface of the reducer housing, and there is a possibility that lubricating oil leaks to the outside through the mating surface.

DISCLOSURE

Technical Problem

An object of the present application is to provide a clothing processing apparatus capable of minimizing the deterioration of the durability of a reducer and the deterioration of the durability of a fixing panel on which the reducer is fixed.

Another object of the present application is to provide a clothing processing apparatus capable of minimizing the risk of leakage of lubricating oil from a reducer having an output shaft arranged parallel to the ground or an output shaft inclined at an angle of less than 90 degrees with respect to the ground.

Another object of the present application is to provide a clothing processing apparatus capable of reducing the rotational speed of a rotor and transmitting the reduced rotational speed to a drum with the center of rotation of the rotor and the center of rotation of the drum kept concentrically aligned.

Technical Solution

In accordance with one aspect of the present disclosure, provided is a clothing processing apparatus including a drum including a drum body having a cylindrical shape with two opposing sides open, a front cover arranged to close one of the open sides of the drum body to define a front surface of the drum body, a rear cover arranged to close the other one of the open sides of the drum body to define a rear surface of the drum body, and a drum inlet formed through the front cover in a penetrating manner to communicate with an interior of the drum body, a fixing panel arranged spaced apart from the rear cover, a power transmitter including a housing fixed to the fixing panel, an input shaft having one end positioned outside the housing and an opposite end positioned inside the housing, an output shaft arranged through the fixing panel, the output shaft having one end fixed to the rear cover and an opposite end positioned inside the housing, and a gear unit disposed inside the housing to transmit rotational motion of the input shaft to the output shaft, and a motor including a stator fixed to the fixing panel or the housing to form a rotating magnetic field, and a rotor rotated by the rotor, the one end of the input shaft being fixed to the rotor.

The drum body, the rear cover, and the front cover are formed of a same material, and a thickness of the drum body may be set to be less than a thickness of the rear cover and a thickness of the front cover.

A thickness of the fixing panel may be set to be greater than the thickness of the rear cover.

The clothing processing apparatus may further include a ring-shaped panel bent portion formed by bending the fixing panel in a direction toward the rear cover or in a direction away from the rear cover to surround the output shaft.

The panel bent portion may be formed by bending the fixing panel in the direction toward the fixing panel, and the housing may be positioned inside the panel bent portion.

The clothing processing apparatus may further include a drum bent portion formed by bending the rear cover in a direction toward the front cover or in a direction toward the fixing panel, the output shaft being fixed to the drum bent portion.

Among the thickness of the drum body, the thickness of the rear cover, and the thickness of the front cover, the thickness of the front cover may be set to be the greatest.

Among the thickness of the drum body, the thickness of the rear cover, and the thickness of the front cover, the thickness of the rear cover may be set to be the greatest.

The clothing processing apparatus may further include a drum support rotatably supporting a circumferential surface of the front cover or a circumferential surface of the drum body.

The input shaft and the output shaft may form a concentric axis. The input shaft and the output shaft may be parallel to the ground.

The input shaft and the output shaft may form a concentric axis. The input shaft and the output shaft may be inclined at an angle of less than 90 degrees with respect to a ground.

The housing may include a housing base provided with an input shaft through-hole allowing the input shaft to be arranged therethrough in a penetrating manner, an input shaft support provided to the housing base to surround the input shaft through-hole, a housing circumferential surface extending from an edge of the housing base toward the fixing panel to define an accommodation space, the gear unit being mounted in the accommodation space, a cover body fixed to the housing circumferential surface to close the accommodation space, an output shaft through-hole formed through the cover body in a penetrated manner, the output shaft being inserted into the output shouted through-hole, an output shaft support protruding from the cover body toward the fixing panel to surround the output shaft through-hole, and an oil leakage preventer configured to prevent lubricating oil supplied to the gear unit from being discharged from the accommodation space.

The oil leakage preventer may include a first sealing portion disposed to seal a space between the input shaft support and the input shaft, a second sealing portion disposed to seal a space between the output shaft support and the output shaft, and a third sealing portion disposed to seal a space between the housing circumferential surface and the cover body.

The clothing processing apparatus may further include a cover fixing plate provided on the housing circumferential surface, the cover fixing plate extending away from the housing circumferential surface in a radial direction of the input shaft through-hole such that the cover body is fixed to the cover fixing plate. The third sealing portion may include a ring-shaped sealing protrusion protruding from the cover body toward the cover fixing plate, and a ring-shaped accommodation groove provided in the cover fixing plate, the sealing protrusion being accommodated in the accommodation groove.

Advantageous Effects

The present application provides a clothing processing apparatus capable of minimizing the deterioration of the durability of a reducer and the deterioration of the durability of a fixing panel on which the reducer is fixed.

Furthermore, the present application provides a clothing processing apparatus capable of minimizing the risk of leakage of lubricating oil from a reducer having an output shaft arranged parallel to the ground or an output shaft inclined at an angle of less than 90 degrees with respect to the ground.

Furthermore, the present application provides a clothing processing apparatus capable of reducing the rotational speed of a rotor and transmitting the reduced rotational speed to a drum with the center of rotation of the rotor and the center of rotation of the drum kept concentrically aligned.

BEST MODE

Hereinafter, embodiments of a clothing processing apparatus will be described in detail with reference to the accompanying drawings.

Figure 1:
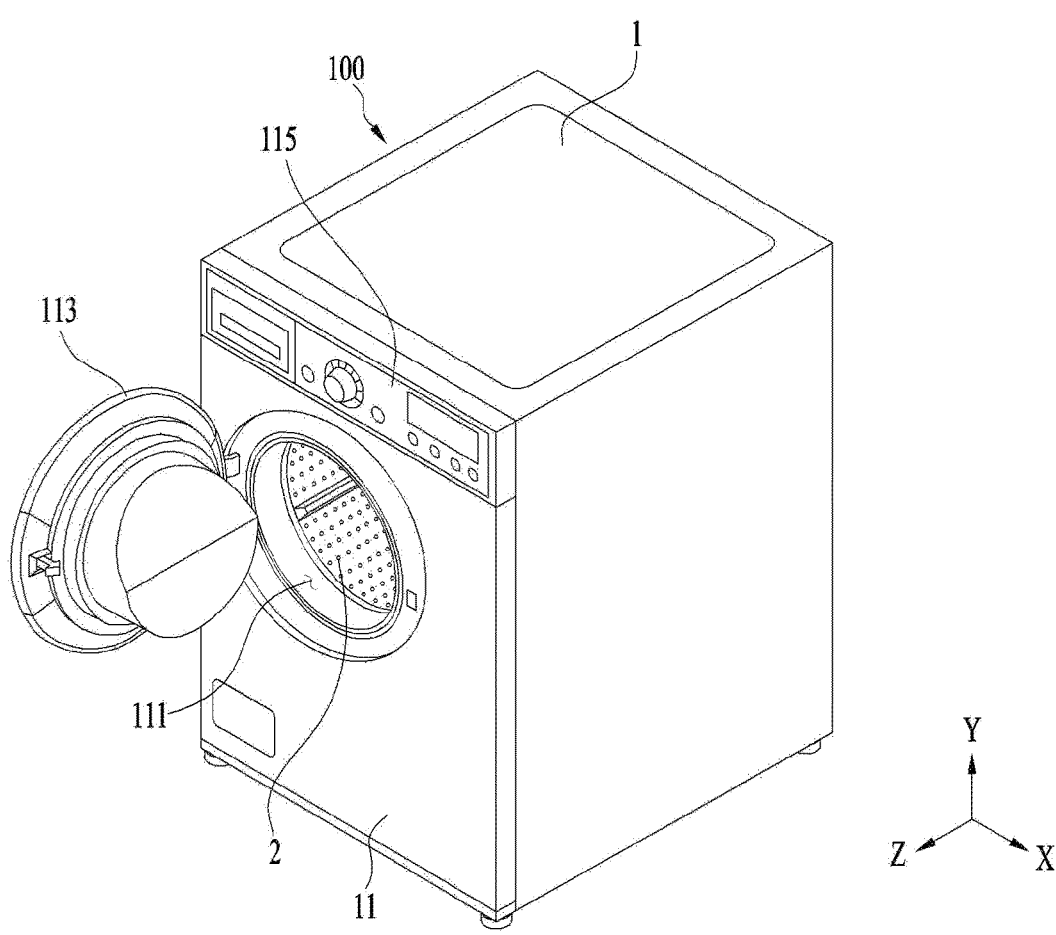
FIG. 1 shows an example of a clothing processing apparatus.
Figure 2:
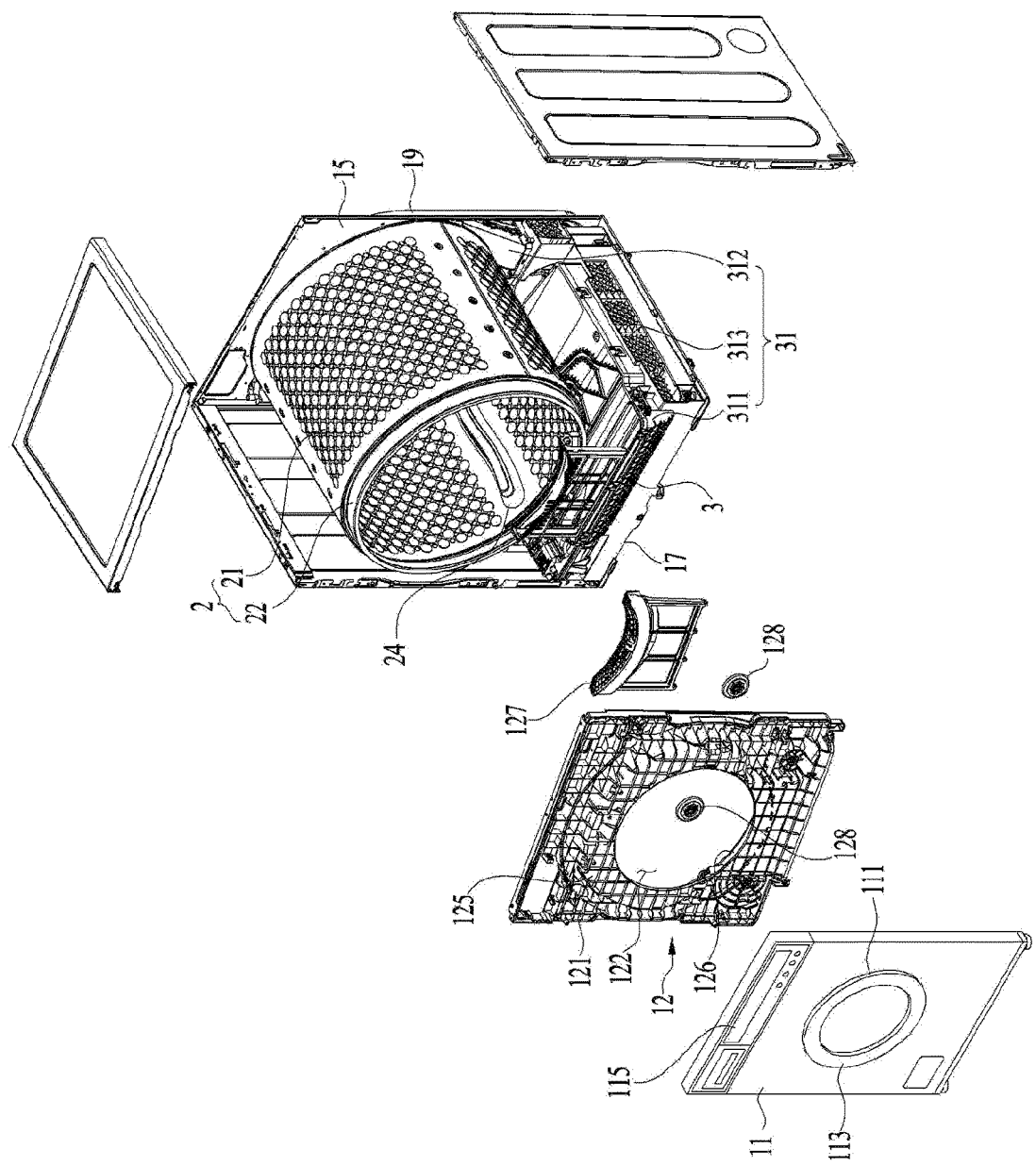
FIG. 2 shows an example of a cabinet structure and a support panel.

FIG. 1 shows an example of a clothing processing apparatus 100. The clothing processing apparatus 100 may include a cabinet 1, and a drum 2 rotatably disposed in the cabinet to provide a space in which clothing (to be washed or dried) is stored. As shown in FIG. 2, a dryer 3 may be provided in the cabinet 1 to supply hot dry air (air having a temperature higher than room temperature, air having a higher degree of dryness than the dryness of room air) to the drum 2 to remove moisture from the clothing.

The cabinet 1 includes a front panel 11 forming a front surface of the clothing processing apparatus, and a base panel 17 forming a bottom surface of the clothing processing apparatus. The front panel 11 is provided with an inlet 111 communicating with the drum 2, the inlet 111 may be arranged to be closed by a door 113.

The front panel 11 is provided with a control panel 115. The control panel 115 may include an input unit configured to receive a control command from a user and a display configured to output information such as a control command selectable by the user. The input unit may include a power supply requester configured to make a request for power supply to the clothing processing apparatus, a course input unit configured to enable the user to select a desired course among a plurality of courses, and an execution requester configured to request initiation of the course selected by the user.

Figure 3:
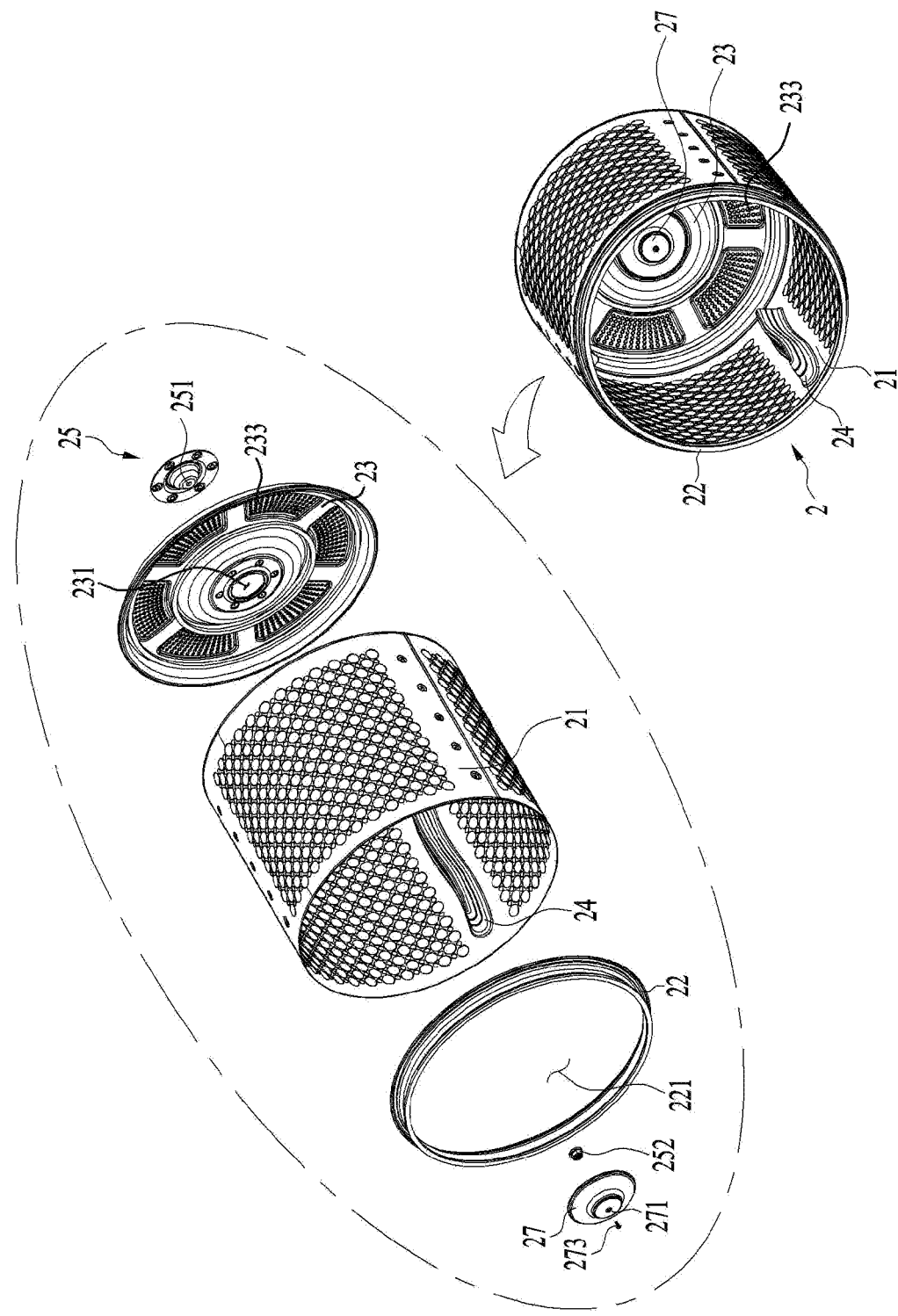
FIG. 3 shows an example of a drum.

The drum 2 may have a hollow cylindrical shape. As shown in FIG. 3, the drum 2 may include a cylindrical drum body 21 having an open front side and an open rear side, a front cover 22 (defining a front surface of the drum) fixed to the drum body 21 to close the front side, and a rear cover 23 (defining a rear surface of the drum) fixed to the drum body 21 to close the rear side.

The front cover 22 may be provided with a drum inlet 221 allowing the inside of the drum body 21 to communicate with the outside therethrough, and the rear cover 23 may be provided with an air inlet 233 allowing external air to be introduced into the drum body 21 therethrough.

The drum body 21 may further include a lifter 24. The lifter 24 is a means for causing the clothing to repeatedly rise and fall in the drum. The lifter 24 may be provided as a plate extending from the front cover 22 toward the rear cover 23 protrudes from the drum body 21 toward the center of rotation of the drum 2 (i.e., from a circumferential surface of the drum toward the center of rotation of the drum).

When the clothing processing apparatus 100 is configured as an apparatus dedicated to drying clothing, the drum 2 is not provided with a drum through-hole formed through the drum body 21 to allow the inside of the drum to communicate with the outside of the drum.

When the clothing processing apparatus 100 is provided as an apparatus to dry and wash clothing, a tub to store water may be provided in the cabinet, and the drum may be rotatably arranged in the tub. In this case, the drum body may need to have a drum through-hole that allows the tub and the drum to communicate with each other.

Figure 4:
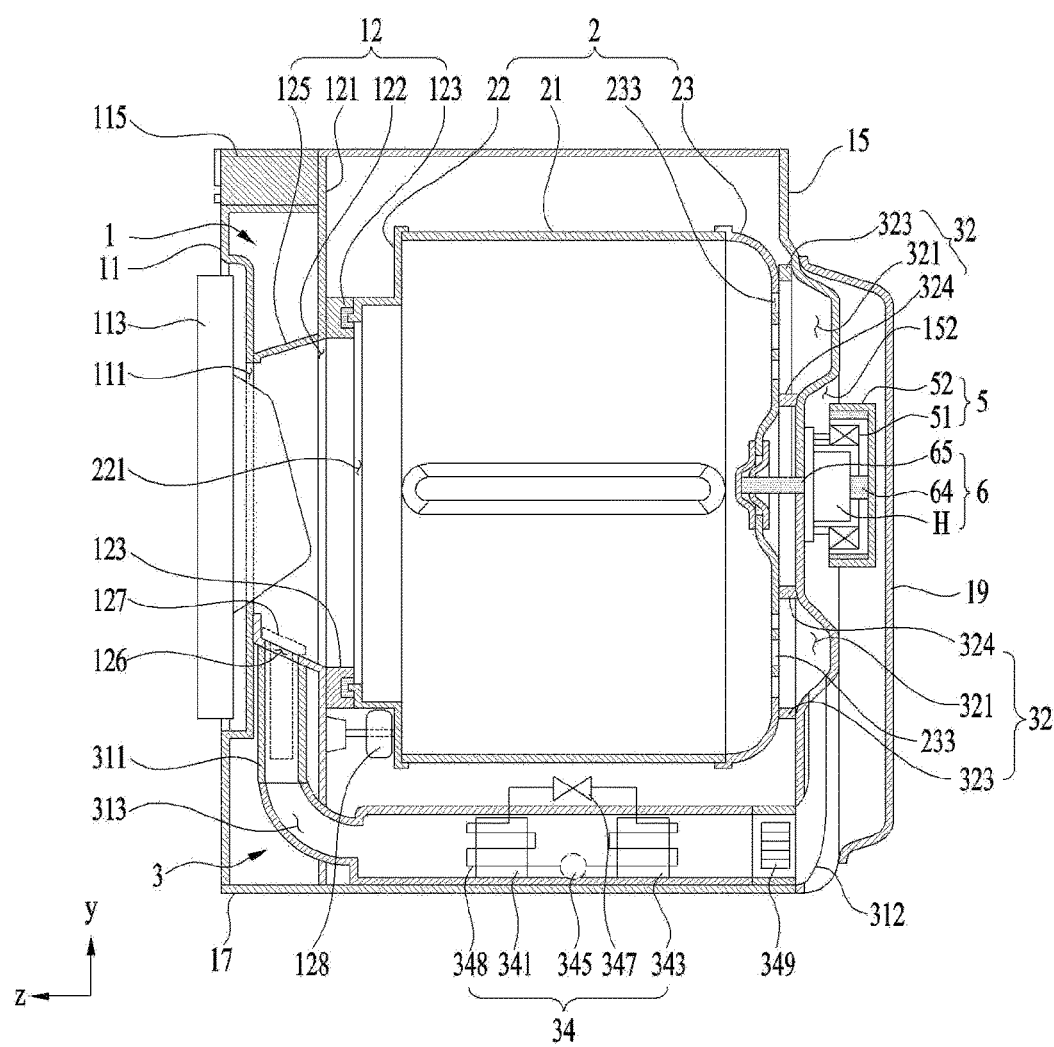
FIG. 4 shows an example of a dryer.

As shown in FIG. 4, the drum 2 described above may be rotatably fixed to at least one of a first body support 12 and a second body support 15. FIG. 4 illustrates an example in which the rear cover 23 is rotatably fixed to the second body support 15 by a power transmitter 6, which will be described later, and the front cover 22 is rotatably connected to the first body support 12.

The first body support 12 may include a support panel 121 fixed to the cabinet 1 and positioned between the front panel 11 and the front cover 22. The support panel 121 may be fixed to the base panel 17 so as to be positioned between the front panel 11 and the front cover 22.

The support panel 121 may include a support panel through-hole 122, a drum connection body 123 connecting the support panel through-hole 122 to the drum inlet 221, and a panel connection body 125 connecting the support panel through-hole 122 and the inlet 111. The support panel through-hole 122 is formed through the support panel 121 to allow the inlet 111 and the drum inlet 221 to communicate with each other.

The drum connection body 123 may be provided as a pipe fixed to the rear surface of the support panel 121 (i.e., the surface facing the drum inlet in the space provided by the support panel). One end of the drum connection body 123 may be arranged to surround the support panel through-hole 122, and a free end of the drum connection body 123 may be arranged to support the front cover 22. That is, the free end of the drum connection body 123 may be inserted into the drum inlet 221, or may be arranged to be in contact with a free end (edge of the drum inlet) of the front cover 22 defining the drum inlet 221. FIG. 4 illustrates an example in which the free end of the drum connection body 123 contacts the free end of the front cover 22.

The panel connection body 125 may be provided as a pipe fixed to the front surface of the support panel 121 (i.e., the surface facing the front panel in the space provided by the support panel). One end of the panel connection body 125 may be arranged to surround the support panel through-hole 122, and the opposite end of the panel connection body 125 may be connected to the inlet 111. Accordingly, the clothing supplied through the inlet 111 may move to the drum body 21 through the panel connection body 125, the support panel through-hole 122, the drum connection body 123, and the drum inlet 221.

An exhaust port 126 for discharging the air from the drum 2 to the outside of the drum may be provided in the support panel 121, and a filter 127 may be detachably fixed to the exhaust port 126. The filter 127 may be formed in any structure capable of filtering foreign substances from the air moving from the drum 2 to the exhaust port 126.

The support panel 121 may further include a drum support 128 to prevent the drum 2 from sagging. The drum support may include a roller fixed to the support panel 121 to rotatably support the drum 2. The drum support 128 may support a region of the drum located below a horizontal line passing through the center of the drum inlet.

Although FIG. 4 illustrates a case where the drum support 128 is arranged to support the front cover 22, the drum support 128 may be arranged to support the circumferential surface of the drum body 21.

Figure 5:
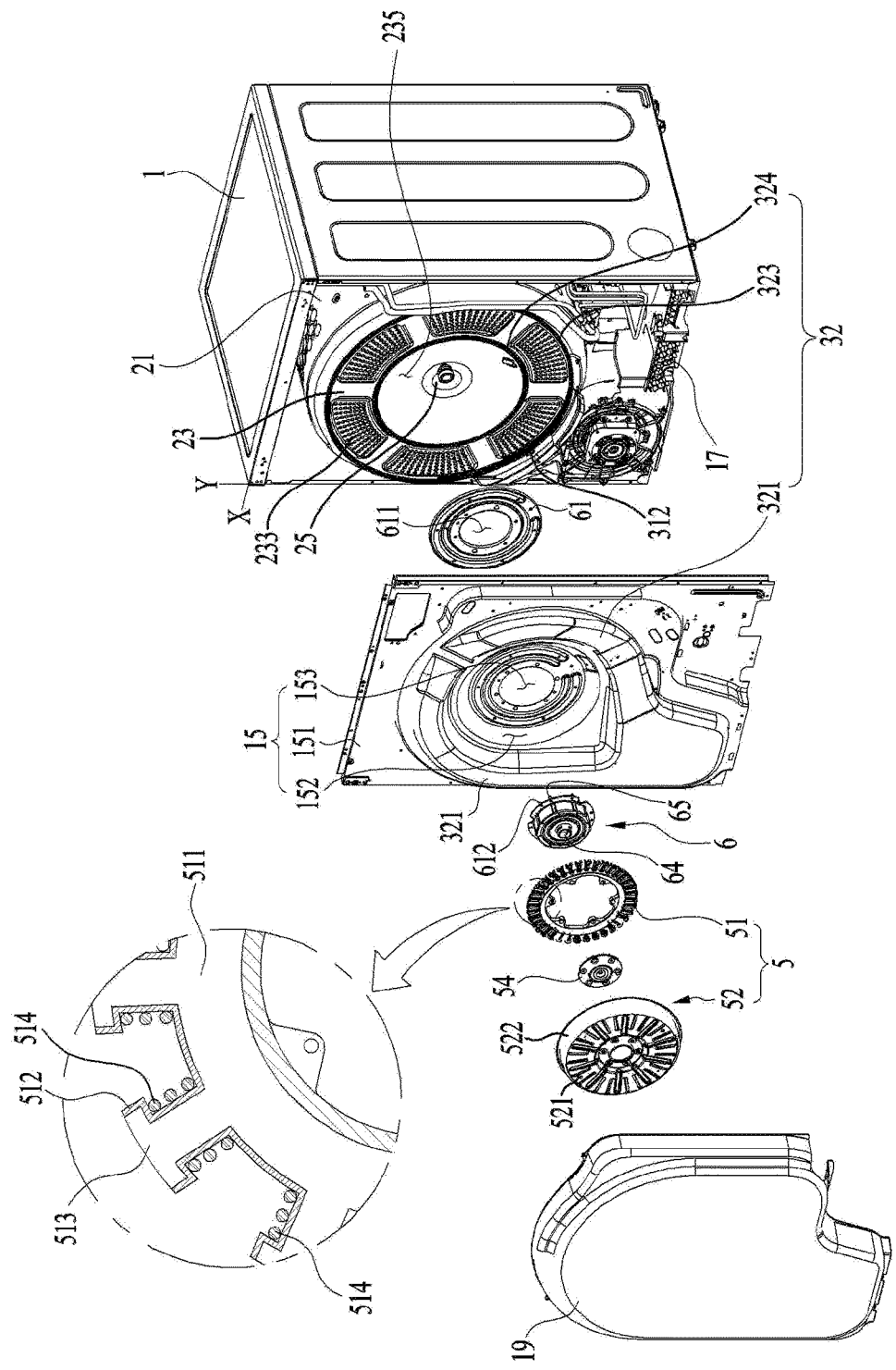
FIG. 5 shows an example of a fixing panel.

The second body support 15 may include a fixing panel 151 fixed to the cabinet 1 to be positioned at a point spaced apart from the rear cover 23. FIG. 5 illustrates an example in which the fixing panel 151 is fixed to the base panel 17 to define the rear surface of the clothing processing apparatus 100 (i.e., the rear surface of the cabinet).

The fixing panel 151 may be provided with a panel bent portion 152, which provides a space in which the motor 5 is mounted. The panel bent portion 152 may be provided as a recess formed by concavely bending the fixing panel 151 to a side on which the rear cover 23 of the drum is positioned. The fixing panel 151 may be provided with a fixing panel through-hole 153 through which a shaft (i.e., an output shaft) for rotating the drum 2 is arranged. The fixing panel through-hole 153 may be positioned inside the panel bent portion 152.

As described above, as the drum 2 includes the drum body 21, the front cover 22 fixed to the drum body, and the rear cover 23 fixed to the drum body, the rigidity of the drum may be increased compared to a structure in which the open front side and rear side of the drum body 21 are rotatably connected to the support panel 121 and fixing panel 151, respectively. By increasing the rigidity of the drum, the deformation of the drum body 21 may be minimized when the drum is rotated, which may suppress the issue of clothing being stuck in the space between the drum body and the support panel and the space between the drum body and the fixing panel (and may minimize the load on the motor) when the drum body 21 is deformed.

As shown in FIG. 4, the dryer 3 may include an exhaust passage 31 connected to the exhaust outlet 126, a supply passage 32 guiding air supplied from the exhaust passage 31 to the drum body 21, and a heat exchanger 34 arranged in the exhaust passage 31 to sequentially perform dehumidification and heating of air.

The exhaust passage 31 may include a first duct 311 connected to the exhaust port 126, a second duct 312 connected to the supply passage 32, and a third duct 313 connecting the first duct 311 and the second duct 312. The third duct 313 may be fixed to the base panel 17.

Various devices capable of sequentially performing dehumidification and heating of the air introduced into the exhaust passage 31 may be provided as the heat exchanger 34. FIG. 4 shows an example in which a heat pump is provided as the heat exchanger 34. That is, the heat exchanger 34 includes a first heat exchanger (heat absorber) 341 configured to remove moisture from the air entering the exhaust passage 31, a second heat exchanger (heater) 343 arranged in the exhaust passage 31 to heat the air passed through the heat absorber, 341, and a fan 349 configured to cause the air discharged from the drum 2 to sequentially pass through the heat absorber and heater and then to move to the supply duct 32.

The heat absorber 341 and the heater 343 are sequentially disposed along the direction of movement of air and are connected to each other by a refrigerant pipe 348 defining a circulation passage for refrigerant. The refrigerant is moved along the refrigerant pipe 348 by a compressor 345 positioned outside the exhaust passage 31, and the refrigerant pipe 348 is provided with a pressure regulator 347 to regulate the pressure of the refrigerant.

As shown in FIG. 5, the air inlet 233 provided in the rear cover 23 of the drum may be provided with a plurality of holes disposed to surround the center of the rear cover 23 (the center of rotation of the drum). In this case, the supply passage 32 may include a supply duct 321 provided in the fixing panel 151 to form a path for the movement of air discharged from the second duct 312, a first flow passage definer 323 and a second flow passage definer 324 to guide the air inside the supply duct 321 to the air inlet 233 by blocking the air inside the supply duct 321 from leaking to the outside.

The supply duct 321 may be configured to form a flow passage (a movement path of air) by bending the fixing panel 151 in a direction away from the rear cover 23. Further, the supply duct 321 may be formed in a ring shape to surround the panel bent portion 152, and an outlet of the second duct 312 may be connected to a circumferential surface of the supply duct 321.

The first flow passage definer 323 may be arranged to surround an outer circumferential surface of the ring formed by the air inlets 233 (a circumferential surface having a longer diameter of the two circumferential surfaces of the ring), and the second flow passage definer 324 may be arranged to surround an inner circumferential surface of the ring formed by the air inlets 233 (a circumferential surface having a shorter diameter of the two circumferential surfaces of the ring).

The first and second flow passage definers 323 and 324 may be fixed to the rear cover 23, or they may be fixed to the supply duct 321. FIG. 5 illustrates an example case where the flow passage definers 323 and 324 are fixed to the rear cover 23.

In the case of FIG. 5, the free end of the first flow passage definer 323 is arranged to surround an outer circumferential surface of the flow passage (ring-shaped flow passage) defined by the supply duct 321, and the free end of the second flow passage definer 324 is arranged to surround an inner circumferential surface of the flow passage defined by the supply duct 321. The first flow passage definer 323 and second flow passage definer 324 may be formed of rubber, felt or the like.

The motor 5, which is configured to generate power required for rotation of the drum 2, includes a stator 51 positioned at the panel bent portion 152 to form a rotating field, and a rotor 52 rotated by the rotating magnetic field. The rotational motion of the rotor 52 is transmitted to the drum 2 via the power transmitter 6 fixed to the fixing panel 151, and the stator 51 is fixed to at least one of the fixed panel 151 or the power transmitter 6.

In order to prevent the motor 5 positioned in the panel bent portion 152 from being exposed to the outside (in order to improve the durability of the motor and prevent safety accidents by preventing the motor from being exposed to the outside environment), the fixing panel 151 may further include a cover panel 19 arranged to prevent the motor 5 from being exposed to the outside. Further, the cover panel 19 may be formed in a shape capable of preventing the supply duct 321 from being exposed to the outside (a shape surrounding the supply duct). This is intended to minimize the dissipation of heat to the outside of the supply duct 321, as well as to prevent accidents that may occur when a human body comes into contact with the supply duct 321.

The stator 51 includes a ring-shaped core 511 having a through-hole (core through-hole) at a center thereof, a plurality of support bars 513 radially protruding from an outer circumferential surface of the core 511, an insulator 512 insulating the core and support bars, and a coil 514 arranged to surround the support bars 513.

The rotor 52 may include a disk-shaped rotor body 521, a rotor circumferential surface 522 extending from an edge of the rotor body 521 toward the fixing panel 515 to form a space in which the stator 51 is accommodated, and a plurality of permanent magnets 523 fixed to the rotor circumferential surface 522 such that N and S poles are alternately exposed.

Figure 6:
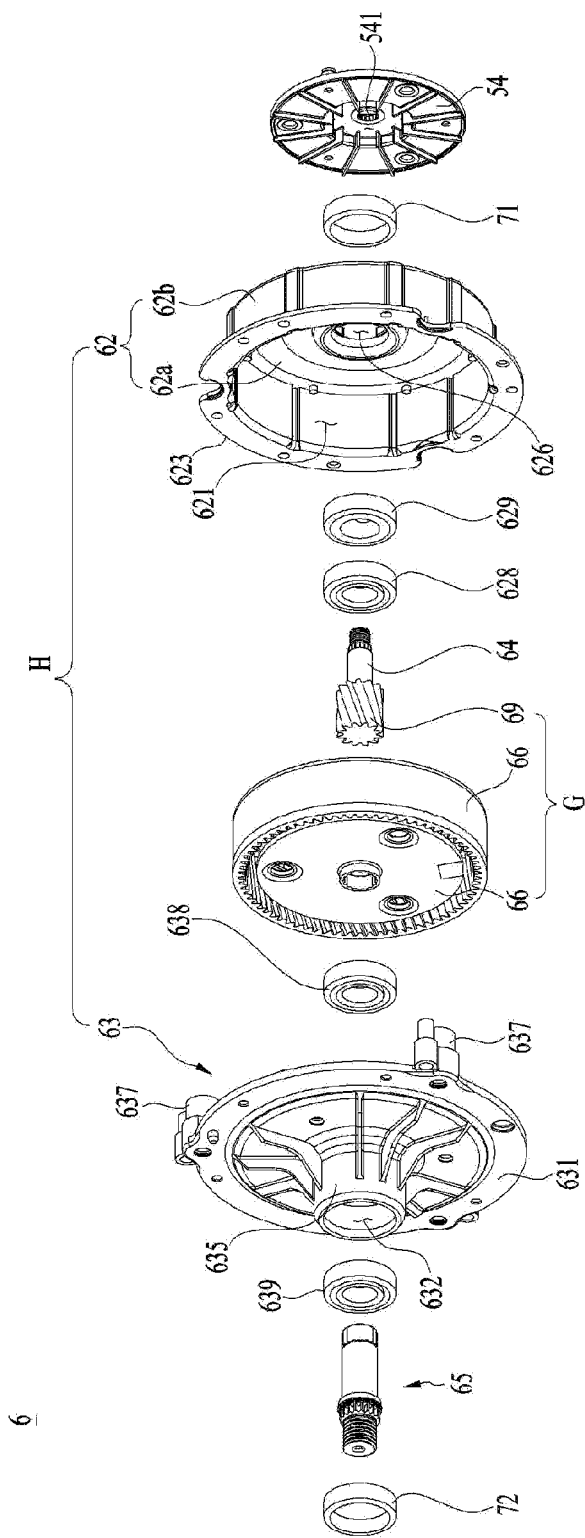
FIGS. 6 and 7 show an example of a power transmitter.

FIG. 6 shows an example of the power transmitter 6 connecting the rotor 52 to the rear cover 23 of the drum.

The power transmitter 6 includes a housing H fixed to the fixing panel 151, an input shaft 64 rotatably fixed to a bottom surface (i.e., the surface facing the position where the rotor is positioned) of the housing H, an output shaft 65 rotatably fixed to a top surface (i.e., the surface facing the position where the fixing panel is positioned) of the housing H, and a gear unit G disposed in the housing to transmit rotational motion of the input shaft 64 to the output shaft 65.

The input shaft 64 may be provided as a shaft having one end fixed to the rotor 52 and an opposite end positioned inside the housing H. The output shaft 65 may be provided as a shaft having one end fixed to the rear cover 23 and an opposite end positioned inside the housing H. The gear unit G is arranged to connect one end of the input shaft 64 positioned inside the housing H and one end of the output shaft 65 positioned inside the housing H.

The housing H is fixed to the fixing panel 151 so as to be positioned in a space (space outside the cabinet) separated from the space (space inside the cabinet) in which the drum 2 is positioned. This is intended to minimize the transfer of heat inside the cabinet (heat emitted by the drum or the dryer) to the inside of the housing H and thus improve the durability of the power transmitter 6.

The input shaft 64 may be coupled to the rotor body 521 by a shaft fixing portion 54. The shaft fixing portion 54 may include an shaft fixing hole 541 to which one end of the input shaft 64 is fixed.

The output shaft 65 may be inserted into the fixing panel through-hole 153 and connected to the rear cover 23, which may be provided with a shaft fastening portion 25. The output shaft 65 is fixed to the shaft fastening portion. This is intended to decentralize the stress acting on the center of the rear cover 23 when the output shaft 65 is rotated.

The shaft fastening portion 25 may be provided in a drum bent portion 235, which is provided in the rear cover 23. The drum bent portion 235 may be provided as a groove formed by bending the rear cover 23 toward the front cover 22 to form a ring surrounding the output shaft 65. The drum bent portion 235 may attenuate transmission of the vibration of the rear cover 23 to the output shaft 65.

Since the panel bent portion 152 provided in the fixing panel 151 is capable of minimizing the transmission of the vibration of the housing H to other areas of the fixing panel 151, the clothing processing apparatus 100 provided with the drum bent portion 235 or panel bent portion 152 may minimize transmission of vibration of the drum to the power transmitter 6 (which may improve the durability of the drum, the fixing panel, and the power transmitter).

In order to minimize deformation of the fixing panel 151, the housing H may be fixed to the fixing panel 151 via a transmitter bracket 61 and the housing fastening portion.

As shown in FIG. 5, the transmitter bracket 61 may be provided with a bracket through-hole 611 through which the output shaft 65 is arranged, and the housing fastening portion may be provided with a bolt connecting the housing H and the transmitter bracket 61. The transmitter bracket 61 may be formed of the same material as the fixing panel 151, or may be formed of a material having a strength higher than that of the fixing panel 151.

As shown in FIG. 6, the housing H may include a housing body 62 having a hollow cylindrical shape and having an open hole in a surface facing the fixed body 151, and a housing cover 63 fixed to the housing body 62 to close the open hole.

The housing body 62 may be formed to define an accommodation space 621 in which the gear unit G is mounted. The accommodation space 621 may be defined by a housing base 62a to which the input shaft 64 is fixed, and a housing circumferential surface 62b extending from an edge of the housing base 62a toward the housing cover 63.

Figure 7:
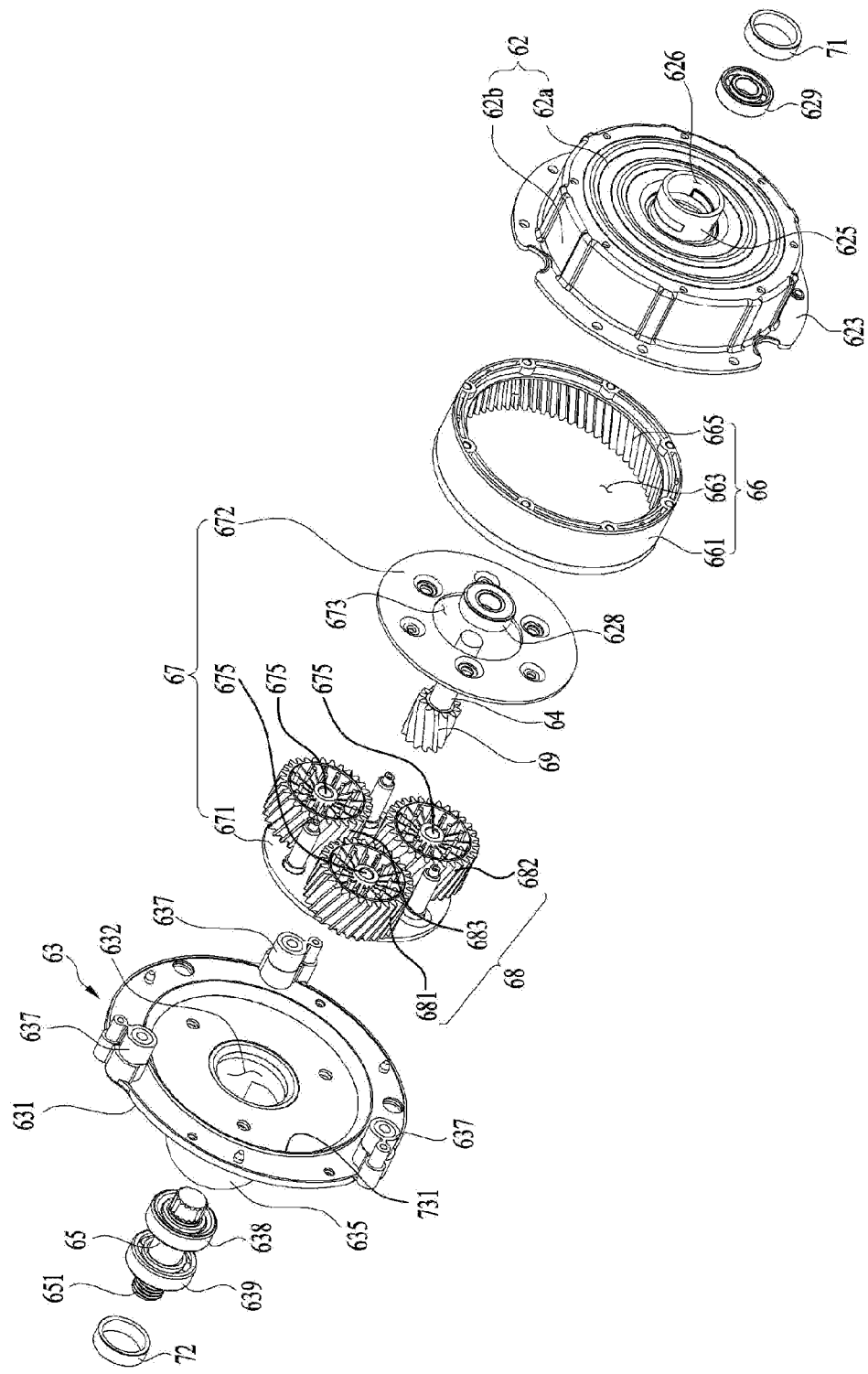

As shown in FIG. 7, the housing body 62 may be provided with an input shaft support 625 extending from the housing base 62a toward the rotor 52. The input shaft support 625 may be provided as a pipe surrounding an input shaft through-hole 626, which is formed through the housing body 62.

The input shaft 64 inserted into the input shaft through-hole 626 is rotatably fixed to the input shaft support 625 through input shaft bearings 628 and 629. The input shaft bearings may include a first input shaft bearing 628 fixed to the input shaft support 625, and a second input shaft bearing 629 fixed inside the input shaft through-hole 626 and positioned between the first input shaft bearing 628 and the rotor 52.

The housing cover 63 may be formed in any shape as long as it is capable of opening and closing an opening provided in the housing body 62. FIG. 7 illustrates an example case where the housing cover 63 is provided with a disk-shaped cover body 631. The housing cover 63 may be fixed to the housing body 62 through a cover fixing plate 623 provided on the housing circumferential surface 62b.

The housing cover 63 may include an output shaft through-hole 632 formed through the cover body 631 in a penetrating manner, and a pipe-shaped output shaft support 635 extending from the cover body 631 toward the fixed panel 151 to surround the output shaft through-hole 632.

The output shaft support 635 may be provided with output shaft bearings 638 and 639 rotatably fixing the output shaft 65 in the output shaft through-hole 632.

The output shaft bearings may include a first output shaft bearing 638 and a second output shaft bearing 639 that are fixed to the output shaft support 635 and are positioned inside the output shaft through-hole 631.

An edge of the cover body 631 may be provided with a mounting portion 637 to which the stator 51 is fixed. In this case, the stator 51 may be fixed to the housing H by bolts coupling the insulator 512 to the mounting portion 637.

The gear unit G may include a ring gear 66 fixed to the housing circumferential surface 62b and positioned in the accommodation space 621, a drive gear 69 fixed to the input shaft 64 and positioned in the accommodation space 621, a cage 67 positioned in the accommodation space 622 and having an opposite end of the output shaft 65 fixed thereto, and a driven gear 68 rotatably fixed to the cage 67 to connect the drive gear 69 and the ring gear 66.

The ring gear 66 may include a gear body 661 fixed to the housing circumferential surface 62b, a gear body through-hole 663 formed through the gear body in a penetrating manner, and gear teeth 665 provided along an inner circumferential surface of the gear body.

The cage 67 may include a first base 671 positioned inside the gear body through-hole 663, one end of the output shaft 65 fixed to the first base, a second base 672 positioned inside the gear body through-hole 663 and having a base through-hole 673 at the center thereof, and a connection shaft 675 connecting the first base and the second base and forming an axis of rotation of the driven gear 68. Since the output shaft 65 is fixed to the first base 671, rotation of the output shaft 65 is determined depending on whether the cage 67 is rotated.

The driven gear 68 may include a plurality of gears rotatably fixed to the connection shaft 675. The figure illustrates a case where the driven gear includes a first driven gear 681, a second driven gear 682, and a third driven gear 683.

The input shaft 64 is inserted into the base through-hole 673 to form a concentric axis with the output shaft 65, and the gear teeth provided to the drive gear 69 are positioned in a space formed between the driven gears to be engaged with the gear teeth of the driven gears 682, 682, and 683.

In order to decentralize the stress acting on the center of the rear cover 23 when the output shaft 65 rotates (i.e., in order to minimize the deterioration of the durability of the rear cover), the output shaft 65 is connected to the rear cover 23 of the drum through the shaft fastening portion 25.

Figure 8:
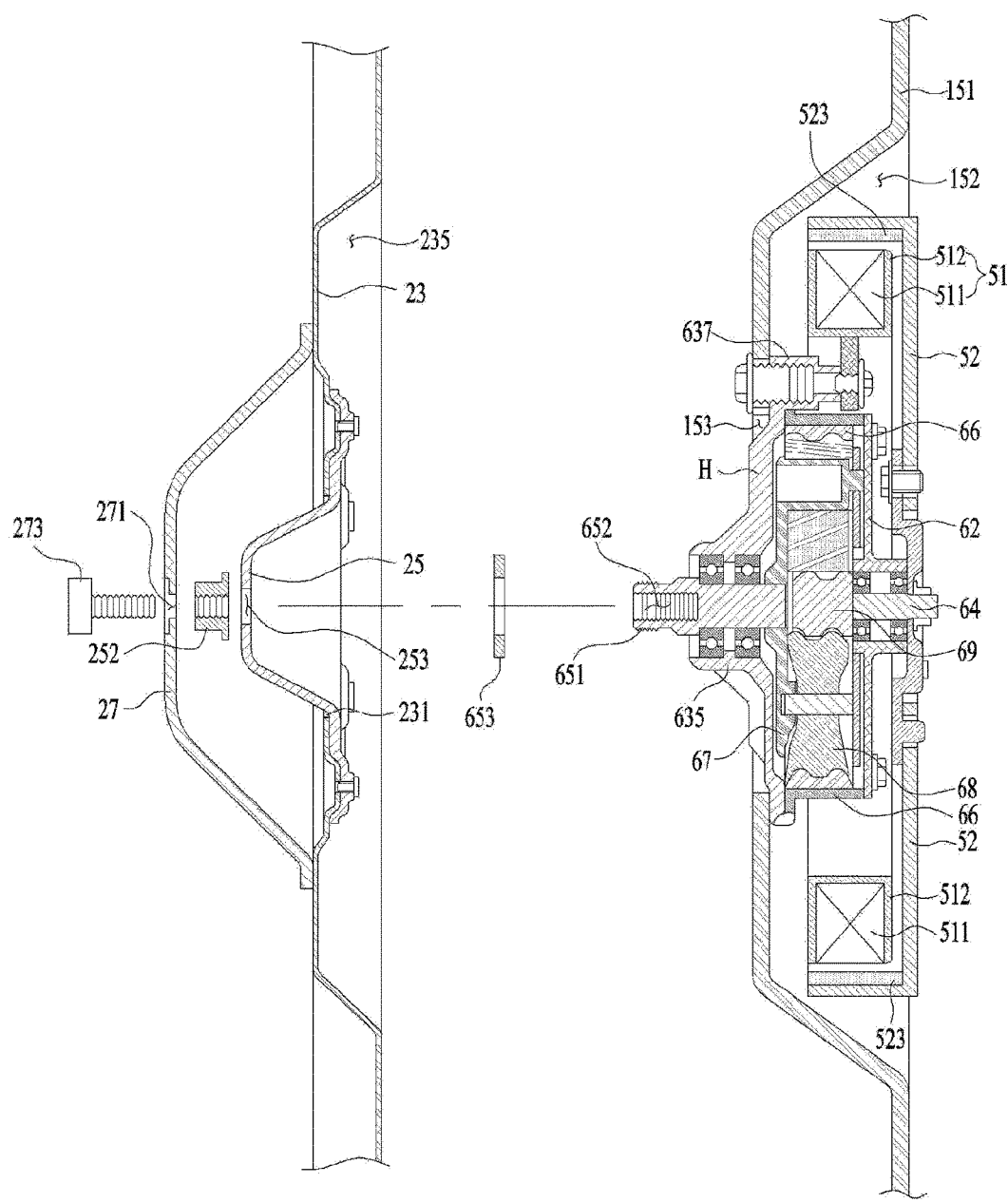
FIG. 8 shows an example of a coupling structure of the power transmitter, the fixing panel, and the drum.

As shown in FIG. 8, the rear cover 23 may be provided with a rear cover through-hole 231, and the shaft fastening portion 25 may be positioned at the drum bent portion 235 of the rear cover 23 to close the rear cover through-hole 231.

The shaft fastening portion 25 is provided with a fastening portion through-hole 251 into which the output shaft 65 is inserted. The output shaft 65 inserted into the fastening portion through-hole 251 may be fixed to the shaft fastening portion 25 by a nut 252. To this end, a screw thread 651 should be provided on the circumferential surface of the output shaft.

In order to prevent the shaft fastening portion 25 from being exposed to the inside of the drum 2, the clothing processing apparatus 100 may further include a fastening portion cover 27. The fastening portion cover 27 may be formed in any shape capable of closing the rear cover through-hole 231 and preventing exposure of the shaft fastening portion 25.

The fastening portion cover 27 may be fixed to the output shaft 65 by a bolt 273. To this end, the fastening portion cover 27 may be provided with a cover through-hole 271 into which the bolt 273 is inserted, and a fastening groove 652 to which the bolt is fastened may be provided at one end of the output shaft 65.

In order to facilitate the coupling between the output shaft 65 and the shaft fastening portion 25, a washer 653 may be further arranged on the output shaft 65. The washer 653 has a diameter larger than the diameter of the free end of the output shaft 65 (i.e., one end of the output shaft on which the screw thread is formed), and the center thereof is provided with a washer through-hole 654 into which the free end of the output shaft 65 is inserted.

The washer 653 may allow the rear cover 23 of the drum and the output shaft 65 to be connected to each other at a right angle (which improves assemblability), and reduce the risk of separation of the nut 252 from the screw thread 651 due to vibration.

The operation of the power transmitter 6 is described below. When the rotor 52 rotates, the input shaft 64 rotates. When the drive gear 69 is rotated by the input shaft 64, the driven gears 681, 682, and 683 engaged with the drive gear 69 also rotate. Since the driven gears 681, 682, and 683 are engaged with the ring gear 66 fixed to the housing body 62, the cage 67 and the output shaft 65 and the drum 2 fixed to the output shaft 65 will rotate when the driven gear 68 rotates.

When the drum 2 rotates in the clothing processing apparatus 100 having the above-described structure, vibration is transmitted to the power transmitter 6 and the fixing panel 151. When the drum rotates, the clothing is repeatedly lifted and dropped inside the drum, and the vibration generated in the drum is transmitted to the gear unit G and the housing H through the output shaft 65. Then, the vibration of the housing H will be transmitted to the fixing panel 151.

In order to minimize the deterioration of the durability of the power transmitter 6 including the gear unit G and the durability of the fixing panel 151, the drum 2 may have a structure capable of absorbing some of vibrations generated when the clothing falls inside the drum.

As described above, the drum 2 is formed by coupling the drum body 21, the front cover 22, and the rear cover 23. In this case, most of the clothing dropped by the rotation of the drum may collide with the drum body 21. Therefore, by setting the rigidity of the drum body 21 to be lower than the rigidity of the front cover 22 and the rigidity of the rear cover 23, the drum body 21 may absorb some of the force generated when the clothing collides with the drum body.

Figure 9:
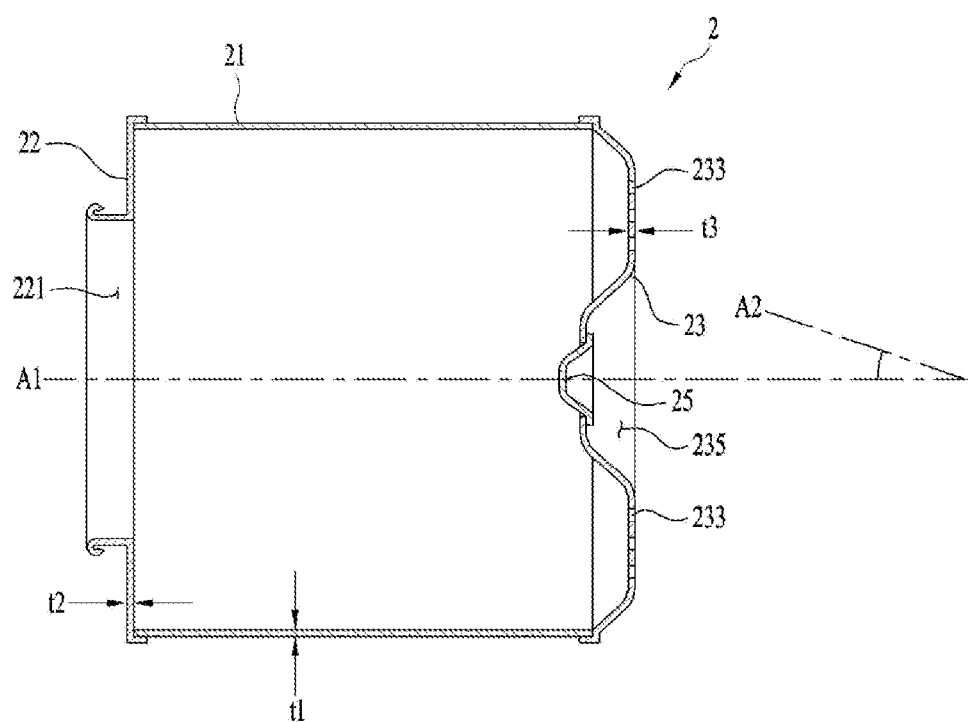
FIGS. 9 and 10 show the structure of the drum.

FIG. 9 shows an example of reducing the rigidity of the drum body 21 when the drum body 21, the front cover 22, and the rear cover 23 are formed of the same material.

In this case, the thickness t1 of the drum body 21 may be set to be less than the thickness t3 of the rear cover 23 and the thickness t2 of the front cover 22. When the thickness t1 of the drum body 21 is set to be less than the thicknesses t2 and t3 of the two covers, some of the force input to the drum 2 when the clothing is dropped may be absorbed by the drum body 21. Accordingly, the drum 2 having the structure of FIG. 9 may minimize the transmission of external force to the housing H and the fixing panel 151.

Since the front cover 22 is provided with the drum inlet 221, the rigidity of the front cover 22 may be lower than that of the drum body 21 or the rear cover 23. To compensate for this issue, the thickness t3 of the front cover 22 may be set to be the greatest in the drum 2. This setting may be applied even in the case where the front cover 22 is supported by the drum support 128 described above.

However, in the case where the circumferential surface of the front cover 22 is supported by the drum support 128, the thickness t3 of the rear cover 23 may be set to be the greatest in the drum 2 because the front cover 22 is less likely to be deformed. This is because the rear cover 23 needs to be configured to transmit the force supplied from the output shaft 65 to the drum body 21. When the thickness t3 of the rear cover is set to be the greatest, the transmission of the vibration of the drum body 21 to the output shaft 65 may be expected to be minimized.

Figure 10:
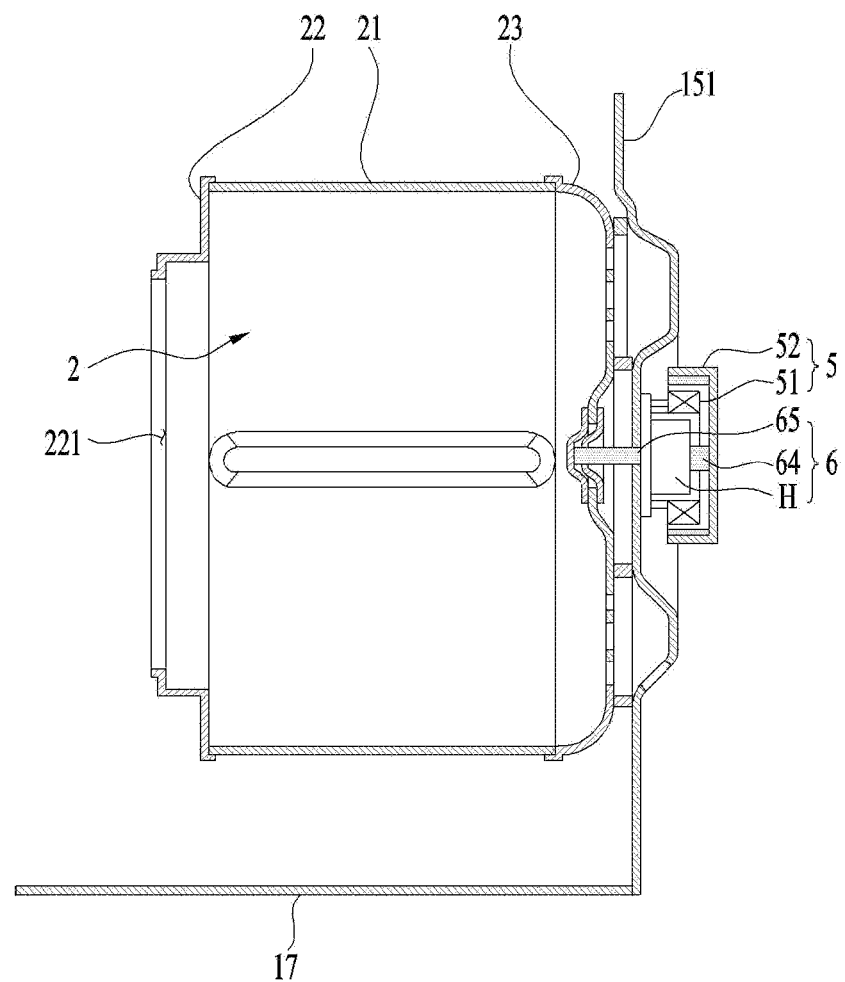

In more detail, referring to FIG. 10, vibration generated inside the drum 2 may be first reduced by the drum body 21 having the least thickness. The vibration not absorbed by the drum body 21 will be absorbed by the rear cover 23, which is thicker than the drum body 21, and the vibration not absorbed by the rear cover 23 will be transmitted to the housing H of the power transmitter 6 via the output shaft 65.

The housing His fixed to the fixing panel 151, and a portion of the vibration transmitted to the housing His absorbed by the fixing panel 151. Accordingly, the clothing processing apparatus having the above-described structure may minimize the transmission of the vibration from the inside the drum 2 to the gear unit G provided inside the housing H.

Since the housing H of the power transmitter 6 is fixed to the panel bent portion 152, the clothing processing apparatus having the above-described structure may also minimize the transmission of the vibration transmitted to the housing H through the output shaft 65 to the other carriers of the fixed panel 15.

Therefore, the clothing processing apparatus 100 may minimize the deterioration of the durability of the power transmitter 6 and the deterioration of the durability of the fixing panel 151 due to the vibration generated during the rotation of the drum.

The output shaft 65 and the input shaft 64 included in the power transmitter 6 form a concentric axis. The output shaft 65 and the input shaft 64 are arranged parallel to the ground (the bottom surface of a space in which the cabinet is installed) (as indicated by A1). This means that the contact surfaces of the housing body 62 and the housing cover 63 are perpendicular to the ground. Due to such structural features, the lubricating oil supplied to the gear unit G may be leaked through the contact surfaces of the housing body 62 and the housing cover 63.

In order to prevent the lubricating oil inside the accommodation space 621 from leaking to the outside of the housing H, the power transmitter 6 may further include an oil leakage preventer 7.

Figure 11:
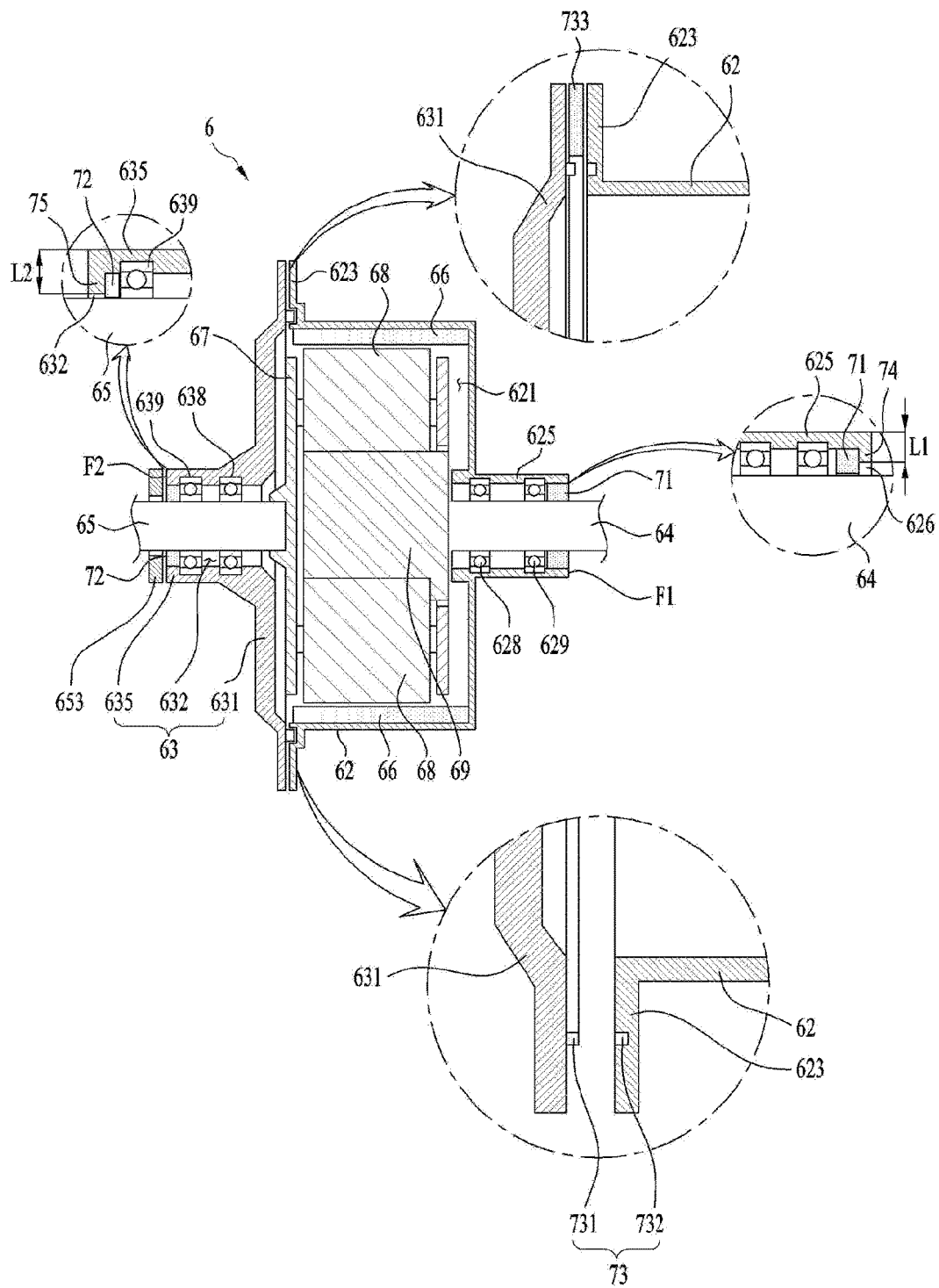
FIG. 11 shows an example of an oil leakage preventer.

FIG. 11 shows an embodiment of the oil leakage preventer 7. The oil leakage preventer 7 may include a first sealing portion 71 for sealing a space between the input shaft support 625 and the input shaft 64, a second sealing portion 72 for sealing a space between the output shaft support 635 and the output shaft 65, and a third sealing portion 73 for sealing the contact surfaces of the housing circumferential surface 62b and the cover body 631.

The first sealing portion 71 may be a ring-shaped gasket fixed inside the input shaft support 625. In this case, the first sealing portion 71 may be disposed between the first input shaft bearing 628 and the second input shaft bearing 629, or may be disposed between the second input shaft bearing 629 and the free end F1 of the input shaft support 625.

The second sealing portion 72 may be a ring-shaped gasket fixed in the output shaft support 635. In this case, the second sealing portion 72 may be disposed between the first output shaft bearing 638 and the second output shaft bearing 639, or may be disposed between the second output shaft bearing 639 and the free end F2 of the output shaft support 635.

Unlike the configuration illustrated in the figure, when the input shafts bearing and the output shaft bearing are each provided as a single bearing, the first sealing portion 71 may be disposed between the input shaft bearing and the free end F1 of the input shaft support, and the second sealing portion 72 is disposed between the output shaft bearing and the free end F2 of the output shaft support.

The third sealing portion 73 may be configured in various structures capable of sealing the circumferential surface 62b of the housing and the contact surface of the cover body 631. In the housing H of FIG. 11, the cover body 631 is connected to the housing body 62 by the cover fixing plate 623. Therefore, the third sealing portion 73 may seal the edge of the cover fixing plate 623 and the cover body 631 (i.e., a region contacting the cover fixing plate).

As shown in the figure, the third sealing portion 73 may be provided as a ring-shaped gasket 733 positioned between the cover body 631 and the cover fixing plate 623.

Alternatively, the third sealing portion 73 may include a ring-shaped sealing protrusion 731 protruding from one of the cover body 631 and the cover fixing plate 623 toward the other, and a sealing groove 732 provided on the other of the cover body 631 and the cover fixing plate 623 to accommodate the sealing protrusion 731. In the example shown in the figure, the cover body 631 is provided with the sealing protrusion 731, and the cover fixing plate 623 is provided with the sealing groove 732. The sealing protrusion 731 and the sealing groove 732 may be bonded to each other through thermal bonding.

Although not shown in the figure, the number of sealing protrusions 731 and the number of sealing grooves 732 may each be two or more. That is, the sealing protrusion 731 includes a first protrusion having a ring shape around the output shaft through-hole 632 and a second protrusion having a ring shape with a diameter greater than a diameter of the first protrusion, and the sealing groove 732 may include a first groove in which the first protrusion is accommodated, and a second groove in which the second protrusion is accommodated.

In addition, the third sealing portion 73 may include the sealing protrusion 731, the sealing groove 732, and the gasket 733. In this case, the gasket 733 may be arranged to surround the sealing protrusion 731, or the sealing protrusion 731 may be arranged to surround the gasket 733.

The first sealing portion 71 and the second sealing portion 72 may be formed of a material different from that of the housing H. In this case, since the thermal strain of the sealing portions 71 and 72 is different from that of the housing H, the sealing portions 71 and 72 may be separated from the housing H in some cases.

In order to prevent the first sealing portion 71 and the second sealing portion 72 from being separated from the housing H, the clothing processing apparatus 100 may further include sealer fixing portions 74 and 75.

The sealer fixing portion may include a first fixing portion 74 configured to prevent the first sealing portion 71 from being separated from the input shaft support 625, and a second fixing portion 75 configured to prevent the second sealing portion 72 from being separated from the output shaft support 635.

The first fixing portion 74 may be provided as a protrusion or a ring-shaped rib protruding from the input shaft support 625 toward the center of the input shaft through-hole 626 (i.e., the circumferential surface of the input shaft). In this case, the distance L1 from the circumferential surface of the input shaft support 625 to the free end of the first fixing portion 74 may be longer than the distance from the circumferential surface of the input shaft support 625 to the circumferential surface of the first sealing portion 71, and may be shorter than the distance from the circumferential surface of the input shaft support 625 to the circumferential surface of the input shaft 64.

Similarly, the second fixing portion 75 may be provided as a protrusion or a ring-shaped rib protruding from the output shaft support 635 toward the center of the output shaft through-hole 632 (i.e., the circumferential surface of the output shaft). In this case, the distance L2 from the circumferential surface of the output shaft support 635 to the free end of the second fixing portion 75 may be longer than the distance from the circumferential surface of the output shaft support 635 to the circumferential surface of the second sealing portion 72, and may be shorter than the distance from the circumferential surface of the output shaft support 635 to the circumferential surface of the output shaft 65.

Although the embodiments have been described based on the clothing processing apparatus 100 in which the drum 2 rotates about a shaft parallel to the ground, the structure of the drum 2 and the oil leakage preventer 7 may be applied even when the shaft of the drum is inclined with respect to the ground. That is, as shown in FIG. 9, the drum 2 and the oil leakage preventer 7 may be applied even when a straight line connecting the input shaft and the output shaft is inclined at an angle A2 of less than 90 degrees with respect to the ground.

It should be noted that the above-described clothing processing apparatus can be modified in various forms, and therefore the scope of the present disclosure is not limited to the above-described embodiments.

The invention claimed is:

1. A clothing treatment apparatus comprising:
   a drum comprising:
      a drum body configured to store clothing;
      a front cover defining a front surface of the drum body;
      a rear cover defining a rear surface of the drum body; and
      a drum inlet formed through the front cover in a penetrating manner to communicate with an interior of the drum body;
   a fixing panel arranged spaced apart from the rear cover;
   a power transmitter comprising:
      a housing fixed to the fixing panel;
      an input shaft with one end located outside of the housing and another end located inside the housing;
      an output shaft with one end formed to pass through the fixing panel and fixed to the rear cover and another end positioned inside the housing; and
      a gear unit disposed inside the housing to transmit rotational motion of the input shaft to the output shaft;
   a motor comprising:
      a stator fixed to the fixing panel or the housing to form a rotating magnetic field; and
      a rotor rotated by the rotating magnetic field, the one end of the input shaft being fixed to the rotor; and
      an oil leakage preventer configured to prevent lubricating oil supplied to the gear unit from being discharged from the housing.

2. The apparatus of claim 1, wherein the housing comprises:
   a housing base provided with an input shaft through-hole allowing the input shaft to be arranged therethrough in a penetrating manner;
   an input shaft support provided to the housing base to surround the input shaft through-hole;

a housing circumferential surface extending from an edge of the housing base toward the fixing panel to define an accommodation space, the gear unit being mounted in the accommodation space;
a cover body fixed to the housing circumferential surface to close the accommodation space;
an output shaft through-hole formed through the cover body in a penetrated manner, the output shaft being inserted into the output shaft through-hole; and
an output shaft support protruding from the cover body toward the fixing panel to surround the output shaft through-hole,
wherein the oil leakage preventer comprises:
a first sealing portion disposed to seal a space between the input shaft support and the input shaft;
a second sealing portion disposed to seal a space between the output shaft support and the output shaft; and
a third sealing portion disposed to seal a space between the housing circumferential surface and the cover body.

3. The apparatus of claim 2, further comprising:
a cover fixing plate provided on the housing circumferential surface, the cover fixing plate extending away from the housing circumferential surface in a radial direction of the input shaft through-hole such that the cover body is fixed to the cover fixing plate,
wherein the third sealing portion is provided as a ring-shaped gasket disposed between the cover body and the cover fixing plate.

4. The apparatus of claim 2, further comprising:
a cover fixing plate provided on the housing circumferential surface, the cover fixing plate extending away from the housing circumferential surface in a radial direction of the input shaft through-hole such that the cover body is fixed to the cover fixing plate,
wherein the third sealing portion comprises:
a ring-shaped sealing protrusion protruding from the cover body toward the cover fixing plate; and
a ring-shaped sealing groove provided in the cover fixing plate, the sealing protrusion being accommodated in the sealing groove.

5. The apparatus of claim 4, wherein the sealing protrusion comprises:
a first protrusion having a ring shape and centered on the output shaft through-hole; and
a second protrusion having a ring shape and centered on the output shaft through-hole, the second protrusion having a diameter greater than a diameter of the first protrusion,
wherein the sealing groove comprises:
a first groove allowing the first protrusion to be accommodated therein; and
a second groove allowing the second protrusion to be accommodated therein.

6. The apparatus of claim 4, wherein the sealing protrusion and the sealing groove are bonded to each other through thermal bonding.

7. The apparatus of claim 6, wherein the third sealing portion further comprises:
a gasket formed in a ring shape surrounding the sealing protrusion and disposed between the cover body and the cover fixing plate.

8. The apparatus of claim 2, further comprising:
an input shaft bearing fixed inside the input shaft support to rotatably fix the input shaft to the input shaft support,
wherein the first sealing portion is disposed between the input shaft bearing and a free end of the input shaft support.

9. The apparatus of claim 8, further comprising:
a first fixing portion provided on the input shaft support to prevent the first sealing portion from being withdrawn from the input shaft through-hole.

10. The apparatus of claim 8, further comprising:
an output shaft bearing fixed inside the output shaft support to rotatably fix the output shaft to the output shaft support,
wherein the second sealing portion is disposed between the output shaft bearing and a free end of the output shaft support.

11. The apparatus of claim 10, further comprising:
a second fixing portion provided on the output shaft support to prevent the second sealing portion from being withdrawn from the output shaft through-hole.

12. The apparatus of claim 2, further comprising:
a first input shaft bearing fixed inside the input shaft support to rotatably fix the input shaft to the input shaft support; and
a second input shaft bearing fixed inside the input shaft support to rotatably fix the input shaft to the input shaft support, the second input shaft bearing being disposed between the first input shaft bearing and a free end of the input shaft support,
wherein the first sealing portion is disposed between the first input shaft bearing and the second input shaft bearing or between the second input shaft bearing and the free end of the input shaft.

13. The apparatus of claim 10, further comprising:
a first output shaft bearing fixed inside the output shaft support to rotatably fix the output shaft to the output shaft support; and
a second output shaft bearing fixed inside the output shaft support to rotatably fix the output shaft to the output shaft support, the second output shaft bearing being disposed between the first output shaft bearing and a free end of the output shaft support,
wherein the second sealing portion is disposed between the first output shaft bearing and the second output shaft bearing or between the second output shaft bearing and the free end of the output shaft.

* * * * *